(12) United States Patent
Suttle et al.

(10) Patent No.: US 7,556,493 B2
(45) Date of Patent: Jul. 7, 2009

(54) METHODS AND APPARATUS FOR MOLDING CHOCOLATE

(76) Inventors: James M. Suttle, 55 Manor Dr., East Stroudsburg, PA (US) 18301; George Graham, 96 Bald Eagle Dr., Hackettstown, NJ (US) 07840; Keith A. Chisholm, 29 Musky Ridge Dr., Hackettstown, NJ (US) 07840; Thomas DeMare, 116 Gaisler Rd., Blairstown, NJ (US) 07825; Stephen E. Beavers, 7847 Grasshopper Rd., Georgetown, TN (US) 37336; Thomas M. Collins, 104 N. Liberty St., Nazareth, PA (US) 18064

( * ) Notice: Subject to any disclaimer, the term of this patent is extended or adjusted under 35 U.S.C. 154(b) by 672 days.

(21) Appl. No.: 11/065,973

(22) Filed: Feb. 24, 2005

(65) Prior Publication Data

US 2006/0188622 A1   Aug. 24, 2006

(51) Int. Cl.
*B28B 13/00* (2006.01)
(52) U.S. Cl. .................. 425/449; 425/215
(58) Field of Classification Search .......... 425/134, 425/220, 259, 261, 449, 215; 426/512
See application file for complete search history.

(56) References Cited

U.S. PATENT DOCUMENTS

| | | | |
|---|---|---|---|
| 2,815,273 A | 12/1957 | Trelease | 31/10 |
| 3,957,408 A * | 5/1976 | Clymer et al. | 425/144 |
| 4,059,378 A | 11/1977 | Sollich | 425/362 |
| 4,468,186 A | 8/1984 | Sollich | 425/294 |
| 5,146,844 A | 9/1992 | Dubowik et al. | 99/450.6 |
| 5,397,227 A * | 3/1995 | Hodan et al. | 425/192 S |
| 6,217,927 B1 | 4/2001 | Suttle et al. | 426/515 |
| 6,251,452 B1* | 6/2001 | Weinstein et al. | 426/249 |
| 6,270,826 B1 | 8/2001 | Kashulines, Jr. et al. | 426/512 |
| 6,302,296 B1 | 10/2001 | Nelson et al. | 222/1 |
| 6,302,677 B1 | 10/2001 | Suttle et al. | 425/373 |
| 6,497,568 B1 | 12/2002 | Aasted | 425/547 |
| 6,508,642 B1 | 1/2003 | Aasted | 425/410 |
| 7,284,973 B2 * | 10/2007 | van Esbroeck et al. | 425/89 |

FOREIGN PATENT DOCUMENTS

| | | |
|---|---|---|
| DE | 4334405 A1 | 4/1995 |
| EP | 632962 A1 | 1/1995 |
| EP | 1064851 A1 | 1/2001 |
| EP | 1444901 A2 | 8/2004 |
| EP | 1498037 A1 | 1/2005 |
| FR | 666723 | 10/1929 |
| GB | 833 603 | 4/1960 |
| GB | 1183777 | 3/1970 |
| GB | 2332387 A | 6/1999 |

* cited by examiner

*Primary Examiner*—Maria Veronica D Ewald
(74) *Attorney, Agent, or Firm*—Fitzpatrick, Cella, Harper & Scinto (57) ABSTRACT

Improved methods and apparatus for continuously molding chocolate are disclosed, including a method and apparatus for removing flash from chocolate pieces and products (both molded and otherwise); and a manifold for continuously providing liquid chocolate to a continuous mold and directing excess liquid chocolate away.

14 Claims, 7 Drawing Sheets

METHODS AND APPARATUS FOR MOLDING CHOCOLATE

BACKGROUND OF THE INVENTION

1. Field of the Invention

The invention relates to methods and apparatus for removing flash from chocolate products and similar edibles, and to improved methods and apparatus for continuous molding of chocolate and similar edibles.

2. Discussion of the Related Art

Finished chocolates having a desired three-dimensional shape and/or an image or design imparted to a surface are conventionally produced by molding. Known finished molded chocolate may be a solid block, a hollow shell, or a shell filled with a confectionery material such as fondant, fudge, or soft caramel. Traditional molding processes are highly asset intensive.

Methods and apparatus for the continuous molding of chocolate in a highly efficient manner are described in U.S. Pat. Nos. 6,217,927 B1 and 6,302,677 B1 to Suttle et al., the contents of which are incorporated herein by reference in their entirety, particularly with regard to rotary molding apparatus and methods. The disclosed apparatus comprises a substantially cylindrical rotary mold, having an interior cavity and at least one recess in an exterior radial surface portion of the rotary mold, and a retaining/casting belt that is configured to maintain liquid chocolate deposited in the recess, and to move in unison with the rotational motion of the rotary mold. Liquid chocolate is fed into the recess in the surface of the cooled rotating mold, which is cooled by a coolant having a temperature less than about 10° C. (50° F.) in the interior cavity to lower the temperature of the recess. The liquid chocolate is maintained within the recess with the retaining/casting belt until the liquid chocolate sets to become at least partially solidified molded chocolate.

Rotary molding can result in excess chocolate material at the base of the molded chocolate, also known as "flash." An efficient technique for removing the flash from rotary molded chocolate products has not been previously described and would represent an advance in the art. It would also be a desirable advance in the art to prepare rotary molded chocolates containing inclusions. Such a technique has not been previously described.

Processes for continuously molding other food products are also known in the art, but do not provide for the production of a finished molded chocolate. For example, U.S. Pat. No. 4,059,378 discloses a method of continuously molding chocolate centers, hot sugar masses, fudge, whipped or unwhipped chewing gum or nougat mass, candy cream, and the like, that avoids the need for an extruder. However, the manufacture of such items is not subject to the same functional requirements as molding chocolate, i.e., the production of a detailed surface design and glossy finish.

A need exists for a method and apparatus for efficiently removing flash from chocolate products and chocolate-like products, and in particular there is a need for continuous molding apparatus and methods for preparing chocolates that provides for the removal of flash without leaving a rough unfinished surface. A further need exists for improvements in the existing rotary molding apparatus, such that the process of feeding liquid chocolate to the rotary mold is improved, and which can be adapted to introduce inclusions into the finished molded chocolate pieces. The present invention provides such apparatus and methods.

SUMMARY OF THE INVENTION

In one aspect, the invention is an apparatus for removing flash from chocolate products, comprising a conveyor belt, a heater and a bull nose. In the apparatus, the conveyor belt is adapted to move along a belt path through a first section in which the conveyor belt is in thermal contact with the heater, and a second section in which the conveyor belt is in contact with the bull nose. In the first section, the bottom of the chocolate product having flash moving on the conveyor belt is exposed to a temperature and for a time sufficient to melt at least a portion of the flash without melting the bottom of the chocolate product before reaching the bull nose. The bull nose provides a radius of curvature to the belt path that is sufficiently small that the chocolate is released from the conveyor belt as the conveyor belt passes over the bull nose, while at least a portion of the flash is retained on the conveyor belt. The temperature of the bottom of the chocolate product does not exceed a temperature at which the molded chocolate loses temper or significantly melts, or if the chocolate product is not based on a tempering type of fat system, such as a compound coating, the temperature does not exceed a temperature at which the bottom of the chocolate product melts.

The apparatus may also be provided with a cooling section positioned in the belt path before the first section in which the conveyor belt is in thermal contact with a cooler, adapted to cool the bottom of the chocolate product and the flash to a temperature less than that at which the chocolate sets. Alternatively, chocolate products having flash are provided to the first section having already been cooled to a temperature less than that at which the chocolate sets.

In another aspect, the invention is a corresponding method for removing flash from chocolate products. The method includes the steps of: providing a chocolate product having flash that has been cooled to a temperature less than that at which the chocolate sets; conveying the chocolate product having flash on a first surface of a conveyor belt, such that at least a portion of the flash contacts the conveyor belt; exposing the bottom of the chocolate product and flash to a temperature for a time sufficient to melt at least a portion of the flash without melting or detempering the bottom of the chocolate product, so that at least a portion of the flash adheres to the first surface of the conveyor belt; and passing the conveyor belt around a bull nose, thereby releasing the chocolate product from the conveyor belt while retaining at least a portion of the flash adhered on the conveyor belt.

The step of providing a chocolate product that has been cooled may be conducted on the same conveyor belt as the heating step. Thus, a chocolate product having flash may be placed on the conveyor belt and the chocolate product and the flash may be cooled to a temperature less than that at which the chocolate sets prior to exposing the chocolate product and flash to heat in the first section.

In another aspect, the invention is a manifold for use with a continuous molding apparatus. The molding apparatus has a mold with at least one cavity (and preferably a plurality of cavities) arranged on its outer surface. In the context of rotary molding, "mold" refers to the entire rotating element. The mold is configured for relative motion with respect to the manifold. The manifold comprises a manifold body comprising a port, a liquid chocolate supply conduit, and a liquid chocolate return conduit. The liquid chocolate supply conduit and liquid chocolate return conduit are in fluid communication with each other and, through the port in the manifold body, with the mold cavity.

The manifold body may include a wear block, which is in a sealing relationship against the mold, and a backing plate behind the wear block. Between the wear block and the backing plate, a flow control device may be provided which directs liquid chocolate into the mold cavities. The flow control device may be an insert fitted into the wear block, or a member attached to the backing plate and protruding into the manifold body.

In another aspect of the invention, the corresponding method of molding utilizing the manifold includes the steps of moving a mold having at least one mold cavity relative to the manifold so that a surface of the manifold contacts a surface of the mold. Liquid chocolate is flowed through the manifold body from a liquid chocolate supply conduit, directing at least a portion of the liquid chocolate to fill the mold cavity, and directing excess liquid chocolate from the manifold body through a liquid chocolate return conduit. The liquid chocolate is retained within the mold cavity, for example by a retaining/casting belt. The retaining/casting belt may be positioned immediately after the manifold to prevent flow of the liquid chocolate out of the cavity as the mold is cooled to at least partially solidify the liquid chocolate. The liquid chocolate that has been at least partially solidified is removed as a molded chocolate piece. Preferably, liquid chocolate is provided in excess of an amount required to fill the cavities, and, as the liquid chocolate is retained in the mold cavity, a transient bond is formed between the bottom of the molded chocolate and the belt which assists in removing the molded chocolate from the mold cavity.

In still another aspect, the invention is a method and apparatus for continuously molding chocolate products having inclusions. An apparatus is provided with a substantially cylindrical rotary mold having at least one mold cavity on its outer surface and an interior coolant cavity. Conduits leading to and from the interior cavity connect the interior cavity with a coolant source, effective to cool the mold cavity to at least partially solidify liquid chocolate deposited in the cavity. A feeder deposits liquid chocolate into the mold cavity, and a retaining/casting belt retains the liquid chocolate in the mold cavity until it cools and at least partially solidifies. The apparatus further includes an inclusion feeder capable of manipulating individual inclusions, communicating with the mold cavity to deposit one or more inclusions in the mold cavity prior to the liquid chocolate solidifying, preferably prior to depositing the liquid chocolate into the mold cavity.

In the corresponding method, a substantially cylindrical rotary mold having a plurality of mold cavities on an outer surface thereof is rotated and coolant is circulated from a coolant source through an interior coolant cavity thereof. Liquid chocolate is deposited into the mold cavity and retained in the mold cavity with a retaining/casting belt positioned against the mold cavity until the liquid chocolate at least partially sets. At least one inclusion is placed in an inclusion feeder (which could be a belt, slats or a drum, for example) and the inclusion feeder moves in cooperation with the rotation of the rotary mold until the inclusion is proximate the mold cavity. At that point, the inclusion is deposited into the mold cavity prior to the liquid chocolate solidifying. The inclusion may be deposited in the mold cavity before or after depositing liquid chocolate, but in any case before the liquid chocolate sets. In the specific example of a rotating inclusion feeder drum, the drum is positioned above the rotary mold, and the drum and the mold rotate in opposite directions, such that inclusions fall into each mold cavity by force of gravity prior to the liquid chocolate filling the mold.

DETAILED DESCRIPTION OF THE PREFERRED EMBODIMENTS

As used herein, the term "chocolate" refers to all chocolate or chocolate-like compositions with a fat phase or fat-like composition. As the invention is directed in certain aspects to the control of the characteristics of the fat or fat-like phase of the chocolate, rather than the non-fat materials within the chocolate, the term includes all chocolate and chocolate-like compositions. The term refers, for example, to standardized and non-standardized chocolates, i.e., including chocolates with compositions that conform to the U.S. Standards Of Identity (SOI), and compositions that do not conform to the U.S. Standards Of Identity ("non-SOI chocolate"). Non-SOI chocolates are those chocolates which have compositions which fall outside the specified ranges of the standardized chocolates. As used herein, the term "chocolate" includes dark chocolate, baking chocolate, milk chocolate, sweet chocolate, semi-sweet chocolate, buttermilk chocolate, skim milk chocolate, mixed dairy product chocolate, low fat chocolate, white chocolate, aerated chocolates, compound coatings, and chocolate-like compositions, unless specifically identified otherwise. "Chocolate" also includes crumb solids or solids fully or partially made by a crumb process.

Non-SOI chocolates include those in which at least one of the nutritive carbohydrate sweetener, the cocoa butter, and the milk fat are replaced partially or completely, those in which components that have flavors that imitate milk, butter, or chocolate are added, and those in which other additions or deletions in the formulation are made that are outside FDA standards of identity of chocolate.

The present invention is directed to improvements to chocolate molding apparatus and methods, including, but not limited to, rotary molding apparatus and methods of the type disclosed by Suttle et al. in the aforementioned U.S. Pat. Nos. 6,217,927 B1 and 6,302,667 B1. The present method may also be used to remove flash from conventionally molded chocolate products, and to remove flash from non-molded products, such as chocolate enrobed bars or other enrobed products.

Thus, as used herein, in connection with the method and apparatus for removing flash described herein, "chocolate product" means any edible product having a chocolate or chocolate-like portion from which flash may be removed. Thus a chocolate enrobed bar or other enrobed product, which may have flash to be removed according to the methods and apparatus disclosed herein, is a chocolate product within the scope of the invention. Such chocolate products may be enrobed with non-SOI chocolate, such as compound coating, and they may have non-chocolate interiors (including, without limitation, wafer, nougat, caramel, or the like). Chocolate product also includes molded pieces made by conventional molding processes. As used herein, "molded piece" or "finished chocolate piece" refers to a piece that has been molded in a continuous molding apparatus or in a conventional molding line.

In a rotary molding process, when a retaining/casting belt is configured to maintain chocolate in a recess of a rotary mold (as described in the aforesaid Suttle patents), excess chocolate remains both adhered to the belt and attached to the molded piece, which excess is not intended to form part of the finished molded piece. This excess material is "flash." Conventionally, efforts in the art have concentrated on minimizing the appearance of flash in the first place, and the removal of flash has been treated as a nuisance. However, a certain amount of excess chocolate adhered to the belt in continuous molding may be advantageous in some circumstances because it assists in the demolding of the molded piece from the recess of the mold. This appears to be particularly true when the pieces are very small, about 1 gram, for example. Without wishing to be bound by theory, it appears that in a rotary molding application, the flash increases the surface area adhered to the retaining/casting belt, thereby increasing the pulling force from the belt exerted on the piece, aiding in its release from the cavity. Moreover, an excess of material is desirable to ensure that the mold cavities are filled. However, this leaves the problem of removing the flash from the finished molded piece. The present method and apparatus, at least in part, have been developed to remove flash efficiently from such molded pieces.

Thus, in a first embodiment, the invention comprises an apparatus and a method for removing flash from chocolate products. Although described in connection with a preferred continuous molding apparatus for making molded chocolate pieces, any chocolate product that can be transported on a belt could have flash removed using the apparatus and according to the methods described herein. Specifically, flash can be removed from an enrobed bar or other enrobed product using the disclosed method and apparatus.

In order to perform deflashing (i.e., flash removal) as described herein, it is necessary to provide a chocolate product having flash that has been cooled to a temperature at which the chocolate and the flash at least partially set. Chocolate generally begins to set when cooled to a temperature of about 25° C. Therefore, a chocolate product having flash should be provided to the apparatus such that the surface of the product contacting the conveyor belt has a temperature of 25° C., or less, prior to being heated in the first section. Preferably, a chocolate product is provided having a surface temperature of about 20° C., or less, as lower temperatures allow greater protection against detempering and melting of the chocolate.

A cooled chocolate product may be provided from a cooling tunnel or any other source. Alternatively, cooling may be conducted in a cooling section on the same conveyor belt on which the chocolate product is thereafter conveyed through the first section in which the flash is at least partially melted.

Figure 1:
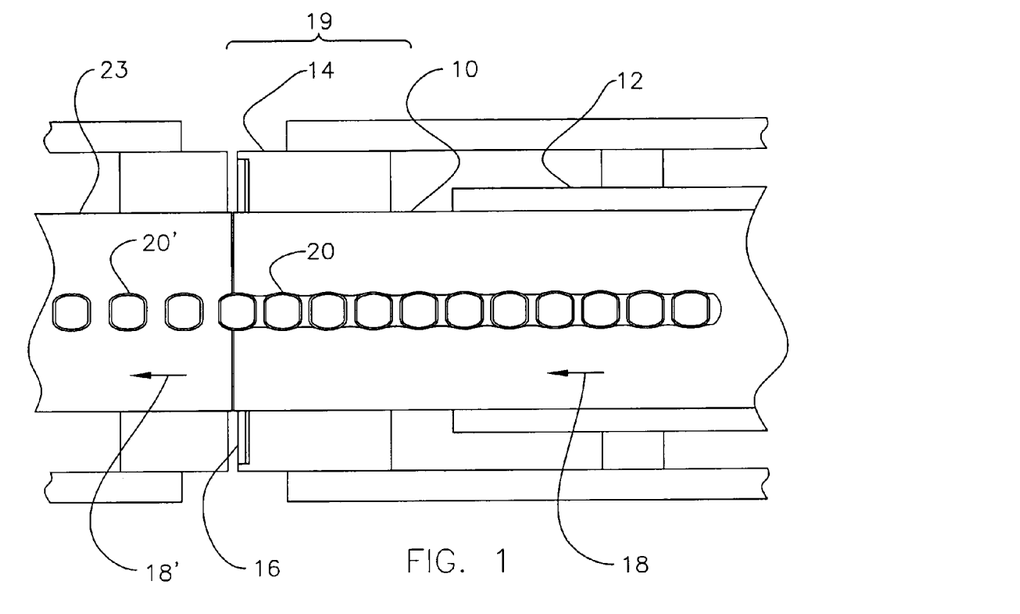
FIG. 1 is a top view of an apparatus for removing flash from molded chocolates.

A preferred apparatus for the removal of flash from chocolate is illustrated in FIG. 1. As shown in FIG. 1, an apparatus according to the invention comprises a conveyor belt 10, and a heater section 19 (referred to herein as the "first section") where the belt is in thermal contact with heater 14. The conveyer belt is configured and adapted to move along a belt path 18. A chocolate product 20 having flash moving on the conveyor is heated in the first section 19 to a temperature and for a time sufficient to melt at least a portion of the flash without significantly melting or detempering the bottom of the molded chocolate before reaching the bull nose 16. The bull nose 16 provides a radius of curvature to the belt, and the molded piece is disengaged from the belt while the flash remains adhered to the belt, so that the flash is removed from the piece. The deflashed piece 20 continues along belt path 18' onto pick-up belt 23.

Figure 2:
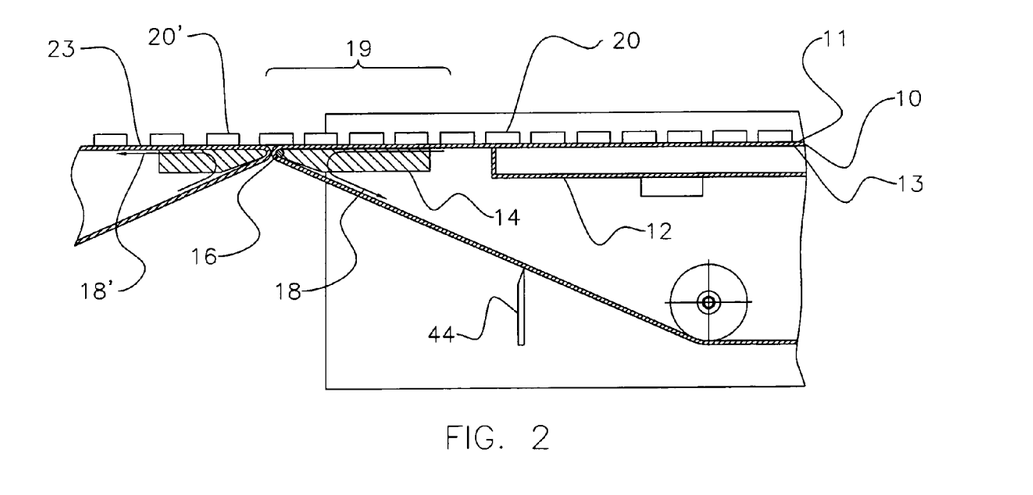
FIG. 2 is a side cutaway view of the apparatus in FIG. 1.

As shown in FIG. 2, in certain embodiments the belt path comprises a cooling section in which the conveyor belt is in thermal contact with cooler 12 (also referred to herein as the "foot freezer"). This cooling section is followed by the first section in which the conveyor belt is in thermal contact with the heater 14, and the second section in which the conveyor belt is in contact with the bull nose 16. Thus, a molded chocolate 20 moving on the conveyor belt (after the piece has been demolded, for example) is cooled by the cooler 12 to a temperature less than that at which the molded chocolate sets. Thereafter, deflashing is conducted as described in connection with FIG. 1, and flash adhering to the belt is removed by scraper 44.

In a preferred embodiment, the apparatus for removing flash is used in connection with a continuous rotary mold, and liquid chocolate is retained in the mold cavity by a retaining/casting belt (not shown). The belt forms a transient bond with the at least partially solidified liquid chocolate which assists in removing the piece from the mold cavity. The retaining/casting belt may then become the conveyor belt passing the cooler, heater and bull nose to remove flash from the chocolate product.

The temperature of the chocolate surface in contact with the belt over the foot freezer, and accordingly the temperature at which the foot freezer must be maintained, depend upon a number of factors, including the mass of chocolate in the piece, the mass of chocolate in the flash, and the amount of time the chocolate will spend in the first section of the belt path where the belt is in contact with the heater. Preferably, the foot freezer is sufficiently cold to chill the surface of the chocolate pieces contacting the belt (and the corresponding surface of the belt) to a temperature in a range of about −10° C. to about 20° C., more preferably in the range of −5° C. to about 15° C., still more preferably in a range of about 0° C. to about 10° C. after the chocolate pieces have passed over the foot freezer. Most preferably, the surface of the chocolate contacting the belt has a temperature of about 5° C. The temperature is selected to ensure that a portion of the mass of chocolate proximate to the bottom of the chocolate product is sufficiently chilled so that the bottom of the chocolate piece does not lose temper or melt after it passes over the heater, while at least a portion of the flash melts. It is believed that the mass of chilled chocolate acts as a heat sink, so that the chocolate piece does not melt or detemper, but the flash (because it is thinner) does melt after passing over the heater.

The desired temperature of the flash and the bottom of the chocolate after the cooling section is a temperature at which the chocolate at least partially solidifies or "sets." In order to maintain these temperatures at the surface of the chocolate in the cooling section, the cooler must provide a surface temperature of the belt in a range of about −25° C. to about 20° C., preferably −25° C. to about 10° C., most preferably in a range of about −10° C. to about 0° C. The cooler may consist of a foot freezer in which circulating cold liquid (for example at a temperature of about −30° C. to about 0° C., preferably −30° C. to about −10° C., still more preferably in a range of about −30° C. to about −20° C.) directly or indirectly contacts the belt. The chocolate generally remains in the cooling section long enough to at least partially set the chocolate, preferably in a range of about 5 to about 115 seconds. More preferably the cooling section is configured so that the chocolate remains in the cooling section for about 20 seconds to about 100 seconds. Most preferably, the chocolate remains in this section for about 60 to about 80 seconds. An exemplary rotary mold may have a diameter of about 16 inches, rotating at about 1 RPM to about 3 RPM, so that the cooling section may be about 8 ft in length preferably about 12 feet, more preferably about 15 feet. At a lower rate of speed, the system can tolerate higher temperatures in the cooling section and still obtain the desired setting of the chocolate product. With thinner mold cavities (and therefore thinner pieces) the mold may be able to operate at about 6 RPM to about 9 RPM, or higher. The advantage of having a longer residence time in the cooling section is that it permits greater flexibility in conditioning the chocolate and allows cooling deeper into the center of the piece. These advantages must be weighted against higher asset expenditure and longer process time inherent in a longer cooling section.

Heater section 19 refers to the first section of the belt path in which the belt and the piece are heated so that the flash softens. The heater 14 may be of any useful type known in the art, including resistance heaters and those heated by a hot fluid. However, it has been found that resistance heaters can overheat, and "overshoot" the desired temperature as they heat up. Thus, it is often difficult to stabilize the temperature of a resistance heater. Therefore, the heater section 14 preferably comprises a heated metal plate having an upper surface in thermal contact with the lower surface of the conveyor belt. The metal plate has a cavity through which a heated fluid is circulated to heat the plate. The optimal temperature depends on the movement of the belt and other factors affecting heat transfer. The plate can attain a temperature from about 30° C. to about 80° C., provided that at least a portion of the flash melts. As used herein, the flash "melts" when at least a portion of the flash softens sufficiently to adhere to the belt. The plate preferably attains a temperature in a range of about 40° C. to about 50° C. Most preferably, the plate is heated by a flow of hot fluid, having a temperature of about 30° C. to about 80° C., which is sufficient to heat the plate. The use of a heating fluid provides a more stable temperature, and prevents overheating chocolate on the belt, which can damage the chocolate, such as by detempering (which in turn can cause bloom on the chocolate), or melting of the bottom of the piece. The temperature in the first section should be sufficient to soften the flash but not hot enough to detemper the bottom of the chocolate piece (in a tempered system) or to melt the bottom of the chocolate piece (in a non-tempered system, such as a compound coating). Thus, in a tempering chocolate system, the surface temperature should be kept below about 30° C., preferably below about 28° C., more preferably below about 26° C. and most preferably below about 24° C. The surface temperature at the bottom of the chocolate product can be monitored by a non contact temperature sensor, such as an infrared (IR) temperature sensor, positioned to measure the surface temperature just as the piece passes beyond the bull nose. Preferably, the chocolate and the flash are heated for a period of time of from about 1 second to about 10 seconds, and, more preferably, from about 2 to about 7 seconds. The length of the first section may be about 6 inches, which may vary depending on the speed at which the product is transported.

The temperature of the belt in contact with the chocolate in the first section is sufficiently warm to soften the flash. The flash typically has a thickness less than about 2.0 mm, in preferred embodiments less than about 1.0 mm, and ideally, less than about 0.1 mm.

When cooling or heating the chocolate product, so that only the flash reaches the softening temperature, the ratio of the thickness of the product to the thickness of the flash may also fall into certain preferred ranges. As noted above, it is believed that the bulk of the chocolate product acts as a heat sink which prevents overheating of the bottom of the chocolate product. A ratio of flash thickness to piece thickness is generally less than about 1:8, preferably less than about 1:16, more preferably less than about 1:32.

The bull nose provides a radius of curvature to the belt path that is sufficiently small that molded chocolate is released from the conveyor belt as the conveyor belt passes over the bull nose, while at least a portion of the flash is retained on the conveyor belt. Typically, the belt path has a change of direction of at least about 90° at the bull nose, preferably, at least about 135°. Most preferably, the belt path has a change of direction of from about 135° to about 150° at the bull nose. Also, the bull nose preferably has a radius of from about 0.125 inch (3.175 mm) to about 1 inch (25.4 mm), although the bull nose may have any radius that is sufficiently small to allow chocolate on the belt to separate from the belt as the belt passes around the bull nose.

The design of the bull nose, and in particular its radius of curvature, will be determined by a number of factors. Typically the bull nose comprises a roller, but a "knife edge" type of bull nose is also known in the art. In any case, the bull nose provides a change of direction which is effective to pull the softened flash from the chocolate product to which it is adhered. In general, the belt will travel in a first direction approaching the bull nose, and a second direction moving away from the bull nose, and the radius of curvature is measured over the change in direction between the first direction and the second direction. In this context, "length" of the chocolate product is in the direction of travel of the belt. In the typical case where the bull nose is a roller, the radius of curvature will simply be the radius of the roller that the belt travels over to change direction. Generally, the ratio of the bull nose radius of curvature to the length of the pieces is less than 2:1 and greater than 0.1:1, preferably greater than 0.3:1. Preferably, the ratio is in a range between 1:1 and 0.5:1. For relatively smaller pieces a sharper bull nose is required to effectively separate the piece from the belt. However, at the low end of piece size and bull nose radius, wear and maintenance of the belt are factors that must be considered. Another consideration is the size of the gap between the point where the belt changes direction over the bull nose 16, and the pick-up belt 23 onto which the chocolate products without the flash may be transferred. The gap must be smaller than the size of the piece 20, and therefore the size of the bull nose 16 and the change of direction must also accommodate positioning the pick-up belt 23. As shown in FIG. 1, the piece after the flash has been removed is indicated by 20'.

The conveyor belt 10 is preferably formed from a highly flexible material having a high thermal conductivity, such that the temperature of the surface of the belt in contact with the flash changes rapidly as the belt moves from thermal contact with the foot freezer to thermal contact with the heater. Most preferably, the belt is a thin belt of TEFLON® (polytetrafluoroethylene) coated KEVLAR® (a para-aramid fiber, where the para-aramid fiber comprises oriented molecular chains of poly-paraphenylene terephthalamide, having inter-chain bonding). Generally, the thickness required for the conveyor belt is determined by the length of the belt path and the speed of the belt along the path, which, in part, determine the required tensile strength of the belt, and the acceptable radius of the bullnose. Preferably, the belt has a thickness of from about 0.008 inch (0.203 mm) to about 0.03 inch (0.762 mm), more preferably from about 0.01 inch (0.254 mm) to about 0.025 inch (0.635 mm), and, most preferably, from about 0.011 (0.279 mm) inch to about 0.02 inch (0.508 mm). A particularly useful belt for use with a rotary molding apparatus has a thickness of from about 0.012 inch (0.305 mm) to about 0.015 inch (0.381 mm). The thermal conductivity of the conveyor belt is preferably from about 130 to about 160 watts/meter·K, more preferably from about 140 to about 155 watts/meter·K, and, most preferably, from about 145 to about 150 watts/meter·K.

In one embodiment, the method of the invention for removing flash from chocolate pieces comprises placing a chocolate piece having flash onto a first surface 11 of conveyor belt 10, such that at least a portion of the flash contacts the conveyor belt, the conveyor belt having a second surface 13 opposite the first surface. The bottom of the chocolate piece and the flash are exposed to a temperature less than that at which the chocolate sets, and then exposed to a temperature in the first section 19 for a time sufficient to soften at least a portion of the flash to adhere at least a portion of the flash to the first surface of the conveyor belt 10 without significantly detempering or melting the bottom of the chocolate. The conveyor belt is passed around a bull nose 16, i.e., a radius of curvature, which disengages the chocolate piece 20 from the conveyor belt, while retaining at least a portion of the flash on the conveyor belt 10. Preferably, the flash is removed from the conveyor belt 10 after the conveyor belt 10 passes around the bull nose 16, preferably by scraping the flash from the surface of the belt with a doctor blade 44.

Figure 5A:
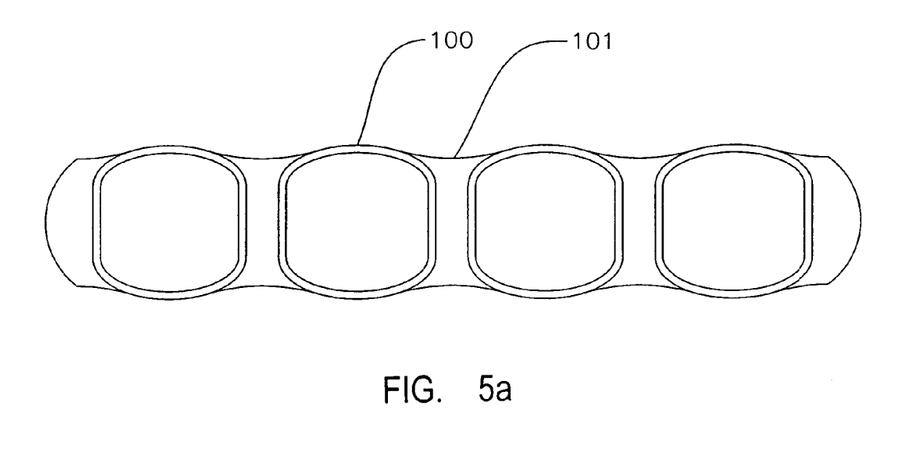
FIG. 5a is a top view of molded chocolate having flash.
Figure 5B:
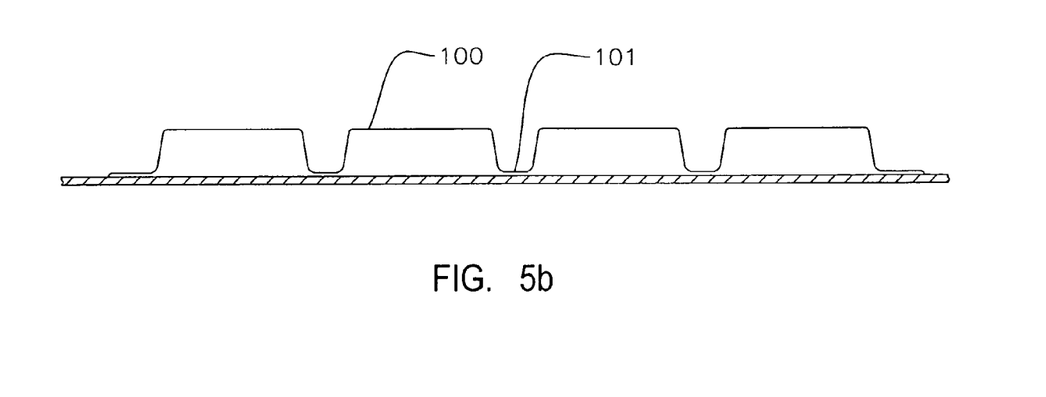
FIG. 5b is a side view of molded chocolate having flash.

The chocolate piece 20 is released from the conveyor belt by peeling the conveyor belt from the bottom of the chocolate piece as the conveyor belt passes around the bull nose 16. Preferably, the released chocolate piece 20' is then transferred to a second conveyance device, such as a pick up belt 23 and proceeds along belt path 18'. FIGS. 5a and 5b show molded pieces 100 connected by flash 101.

Figure 3A:
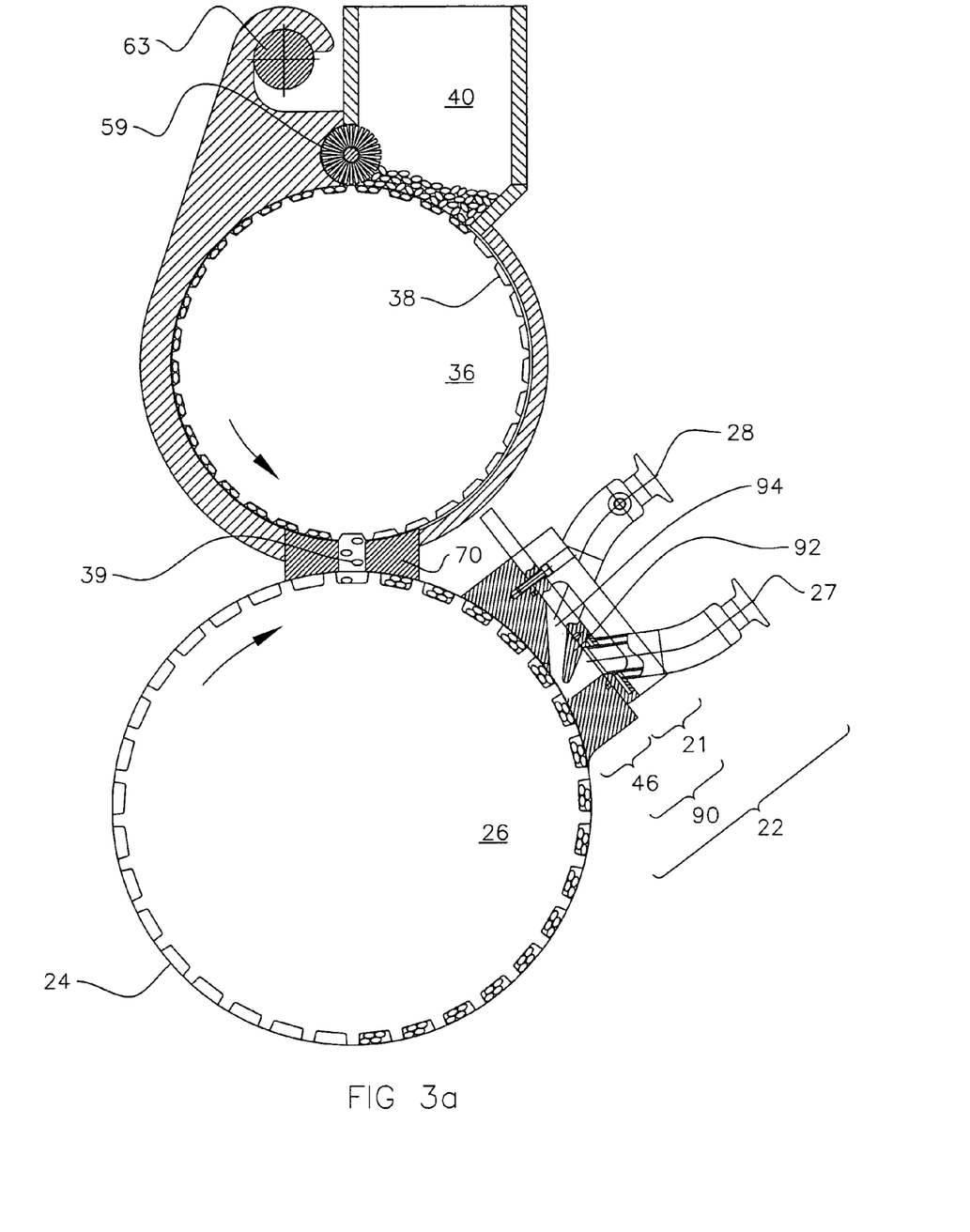
FIG. 3a is a side cutaway view of a rotary molding apparatus, having a member protruding into the manifold body as a flow control device.
Figure 3B:
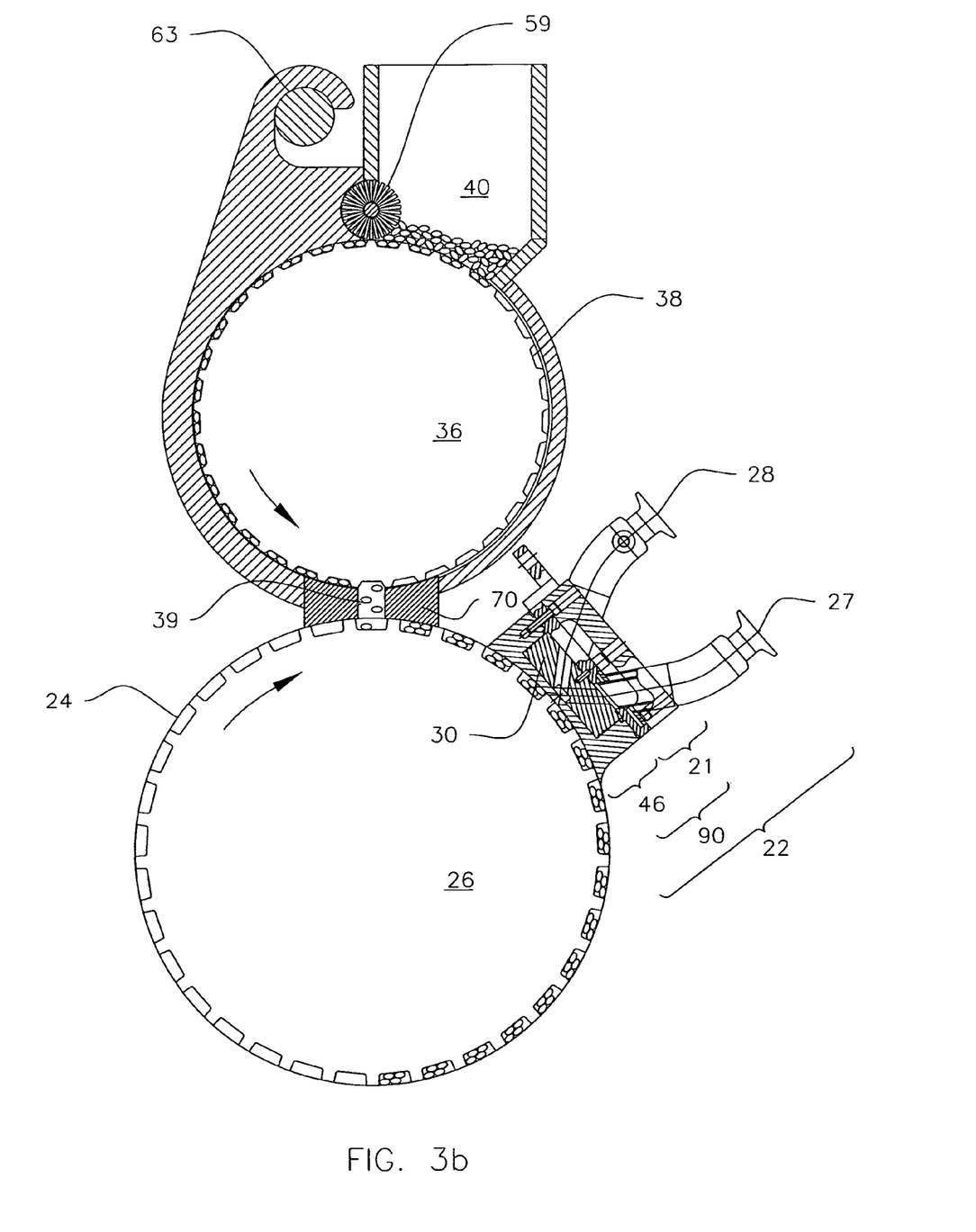
FIG. 3b is a side cutaway view of a rotary molding apparatus including a manifold having a flow control device inserted into the manifold body.

In another aspect, the invention is directed to a manifold for feeding edible starting material to at least one mold cavity which may be incorporated with an apparatus for continuously molding chocolate, such as described in the aforementioned U.S. Pat. Nos. 6,217,927 B1 and 6,302,677 B1, and for carrying excess edible starting material away. Although a rotary mold such as described in these patents is a preferred embodiment, it is also possible that other mold configurations could be implemented without departing from the scope of the invention, such as a flat mold moved linearly with respect to a flat manifold. FIG. 3a and FIG. 3b generally depict an embodiment of the manifold 22 in cooperation with an inclusion feeder drum 36 and rotary mold 26. The manifold comprises manifold body 90, which is that portion of the manifold including the backing plate 21 and the wear block 46. The manifold 22 comprises liquid chocolate supply conduit 27 and a liquid chocolate return conduit 28, which are in fluid communication with the mold cavity 24 and with each other as the mold moves relative to the manifold. Port 29, shown in FIG. 4a, is part of the manifold, and liquid chocolate flows through the port into the mold cavity 24.

Figure 4A:
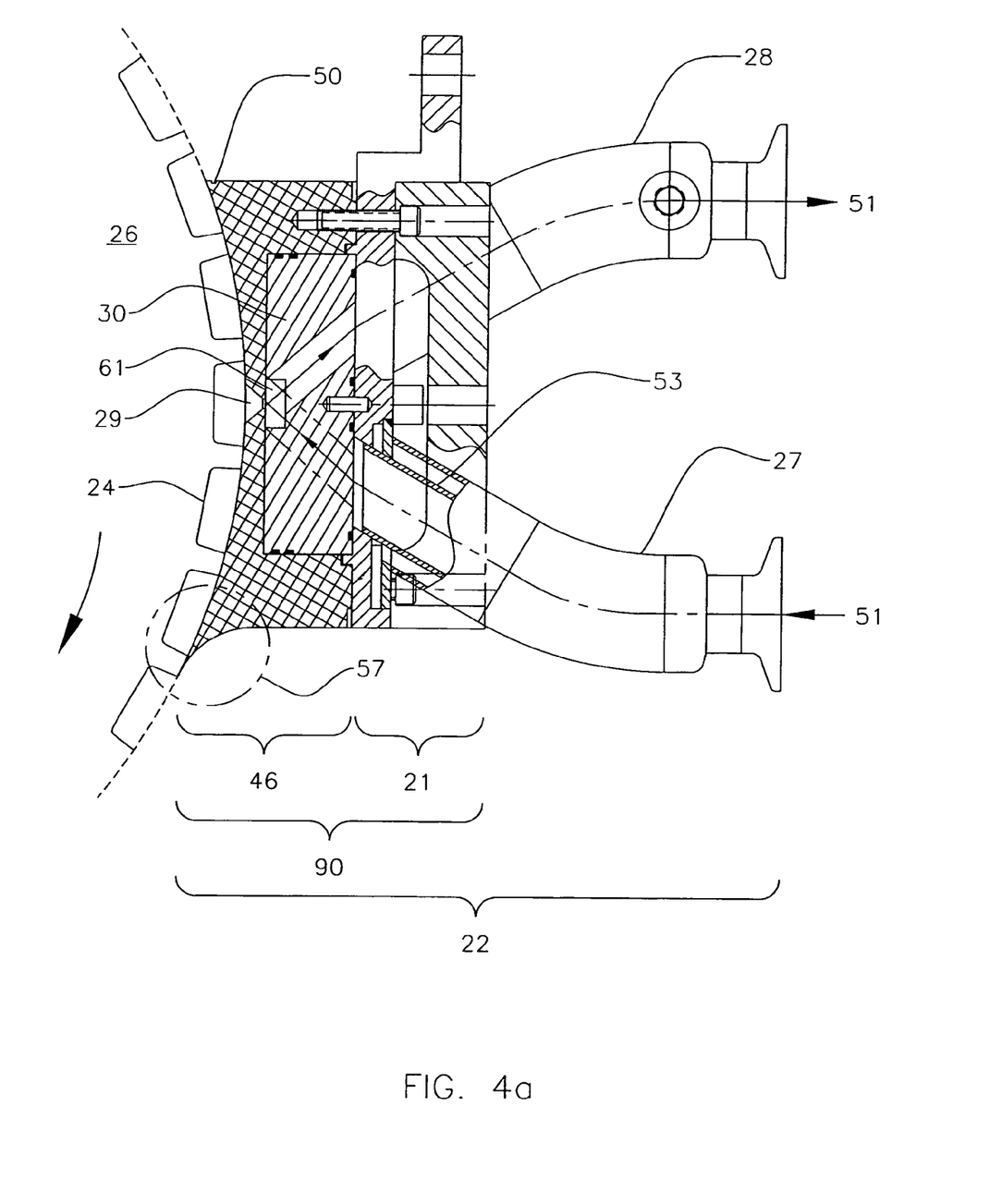
FIG. 4a is a side cutaway view of a manifold including a wear block, a flow control device adapted to be inserted in the manifold body, and supply and return conduits.

As shown in FIG. 4a, the wear block 46 is the portion of the manifold body which fits to seal the manifold against the mold surface. The wear block 46 preferably has a thermal conductivity sufficiently low to substantially eliminate heat loss from the manifold to the mold, while the portions of the manifold in which chocolate is conveyed, such as the supply and return conduits 27, 28, are preferably surrounded by jacketing 53 to maintain a steady temperature. Backing plate 21 is positioned behind the wear block and secures the manifold elements together and is used to press the manifold against the mold 26.

The wear block 46 is positioned to contact the mold and is preferably made of a less thermally conductive material, such as plastic. A particularly preferred material for the wear block is ERTALYTE®, an unreinforced, semi-crystalline thermoplastic polyester based on polyethylene terephthalate available from Quadrant Engineering Plastic Products, Reading, Pa., (US), although many other polymeric materials, or a material having a polymeric coating could also be suitable. The wear block may be provided with a wear indicator 50 which indicates visually how much wear the wear block has undergone due to frictional contact with the mold, and whether the part needs to be replaced. This process could also be automated.

Thermal conductivity is the property of materials that describes the heat flux that will flow through a material if a temperature gradient exists over the material. Thermal conductivity is measured in units of Watts per meter Kelvin (W/mK). As used herein, "high thermal conductivity" is intended to refer to materials that are good conductors, with a thermal conductivity greater than about 10 W/mK, preferably greater than 100 W/mK and more preferably greater than about 200 W/mK. Thus for example, stainless steel is a high thermal conductivity material, with a thermal conductivity of about 16 W/mK. However, aluminum is a more preferred high thermal conductivity material, with a thermal conductivity of about 237 W/mK. A "low thermal conductivity" material, refers to heat insulating materials having a thermal conductivity less than about 10 W/mK, preferably less than about 1 W/mK. Nylon 6, for example, has a thermal conductivity of about 0.25 W/mK. Specialty polymeric insulating materials may have a thermal conductivity of less than about 0.1 W/mK. These values are at best approximate, giving relative orders of magnitude of "high" and "low," and they are intended to provide qualitative rather than quantitative information.

A flow control device may be provided in the body of the manifold to direct liquid chocolate into the mold cavity. In FIG. 3b, and as seen more clearly in FIG. 4a, the flow control device is a fill insert 30 that fits inside the wear block 46. The liquid chocolate supply conduit 27 is in fluid communication with the liquid chocolate return conduit 28 through a conduit in the fill insert 30 in the wear block 46.

The fill insert 30 is configured to direct a flow of liquid chocolate from the liquid chocolate supply conduit 27 into the mold cavities 24 through one or more ports 29 in wear block 46. The fill insert 30 may be made of a more thermally conductive material, for example a metal, such as aluminum. In this manner the thermal efficiency of the molding process is improved. The backing plate 21 permits attachment of the supply conduit 27 and return conduit 28, with their associated thermal jacketing 53 to the fill insert 30.

Figure 4B:
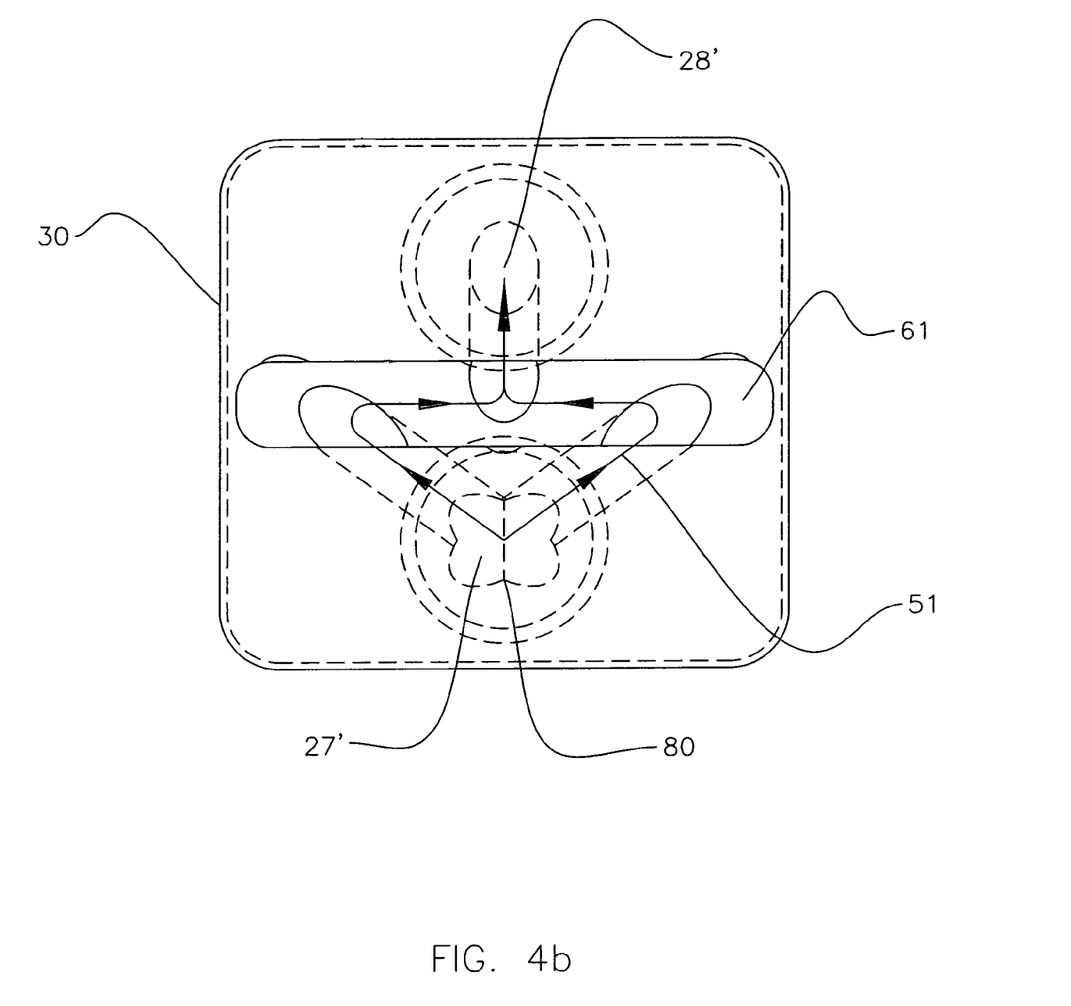
FIG. 4b is a view, from the perspective of the mold side, of a flow control device that may be inserted into the mold body.

Fill insert 30 may be adapted to facilitate the flow through of chocolate and to distribute liquid chocolate to the ports 29 in the wear block 46. Various designs are possible for optimizing the delivery of liquid chocolate to the mold cavities. As shown in FIG. 4b, for example, supply conduit 27 provides liquid chocolate to a diverter 80 in the fill insert 30 so that liquid chocolate is directed to the sides of the fill insert, as shown by liquid chocolate flow path 51. Channel 61 in the fill insert 30 lies over and supplies the ports 29 corresponding to lanes of mold cavities 24 in the mold surface, so that liquid chocolate is supplied to the mold cavities 24 on the sides of the mold first, thereafter traveling inward from the sides, and exiting through return conduit 28. Outline 61' shows the position of the channel 61 in the fill insert when the fill insert is positioned behind the wear block 46. Elements 27' and 28' in FIG. 4b show the central flow channels of the supply and return conduits, respectively.

In FIG. 3a, the flow control device is a member 92 attached to the backing plate 21 protruding into the manifold body which prevents liquid chocolate from bypassing the mold cavity 24. The member 92 may be metal, which provides for good thermal conductivity from the backing plate, or alternatively the member 92 may be made of a polymeric material. In the embodiment depicted in FIG. 3a, the liquid chocolate supply conduit is in fluid communication with the liquid chocolate return conduit through cavity 94 in the manifold body. Member 92 extends into the cavity from the backing plate so that liquid chocolate flowing into the mold cavity 24 is directed at an angle with respect to a line perpendicular to the center tangent of the opening of the cavity (the "flow entry angle"). Preferably, liquid chocolate is directed into the mold cavities at a flow entry angle of at least about 20 degrees from a line perpendicular to the center tangent of the opening of the mold cavity, more preferably from about 20 degrees to about 45 degrees. Most preferably, the flow entry angle is from 30 degrees to about 45 degrees. A screen (not shown) can be used to prevent inclusions from flowing through into the chocolate return conduit 28. When a protruding member type of a flow control device is used, the liquid chocolate is preferably directed into the mold cavities in a direction counter to that of the rotation of the mold. When a fill insert flow control device is used, this preference does not apply, and liquid chocolate may be introduced from either direction.

Returning to the embodiment shown in FIG. 4a, The ports 29 are designed so that the mold can be stopped and restarted. When the mold is stopped, chocolate will continue to circulate from the supply conduit 27 to the return conduit 28, but the chocolate in the area of the port may solidify depending on how long the mold is stopped. However, due to the tapered sidewalls of the port 29, the solidified chocolate is easily dislodged into the next cavity when the mold re-starts and liquid chocolate will resume filling the cavities.

Preferably, the ports 29 are countersunk in the wear block as shown in FIG. 4a, with a tapered sidewall. The taper facilitates removal of solidified chocolate from the port with relatively little backpressure. The ability to easily remove or dislodge solidified chocolate from the port 29 allows starting and stopping the mold, which permits the rotary mold to be used with other unit operations on a production line which may operate at different speeds or under different maintenance schedules. The side wall taper is measured in the same manner as "draft angles" or "release angles" in molding design are measured. Any exit angle greater than zero will likely be effective to permit dislodging solidified chocolate. For example, a 6 degree sidewall taper or greater should be sufficient to permit dislodging of the chocolate, preferably the taper should be 8 degrees or greater, more preferably greater than 10 degrees. For very easy demolding, a taper of 12 degrees or greater is even more preferred, and most preferably the taper should be 15 degrees or greater. The port 29 may be sized to prevent an inclusion, placed into the mold cavity prior to filling the cavity with chocolate, from flowing from the mold cavity back through the port 29.

The port 29 allows the correct amount of liquid chocolate to be delivered to the mold cavities to fill them, while the excess chocolate flows through from the supply conduit 27 to the return conduit 28 behind the port.

Figure 4C:
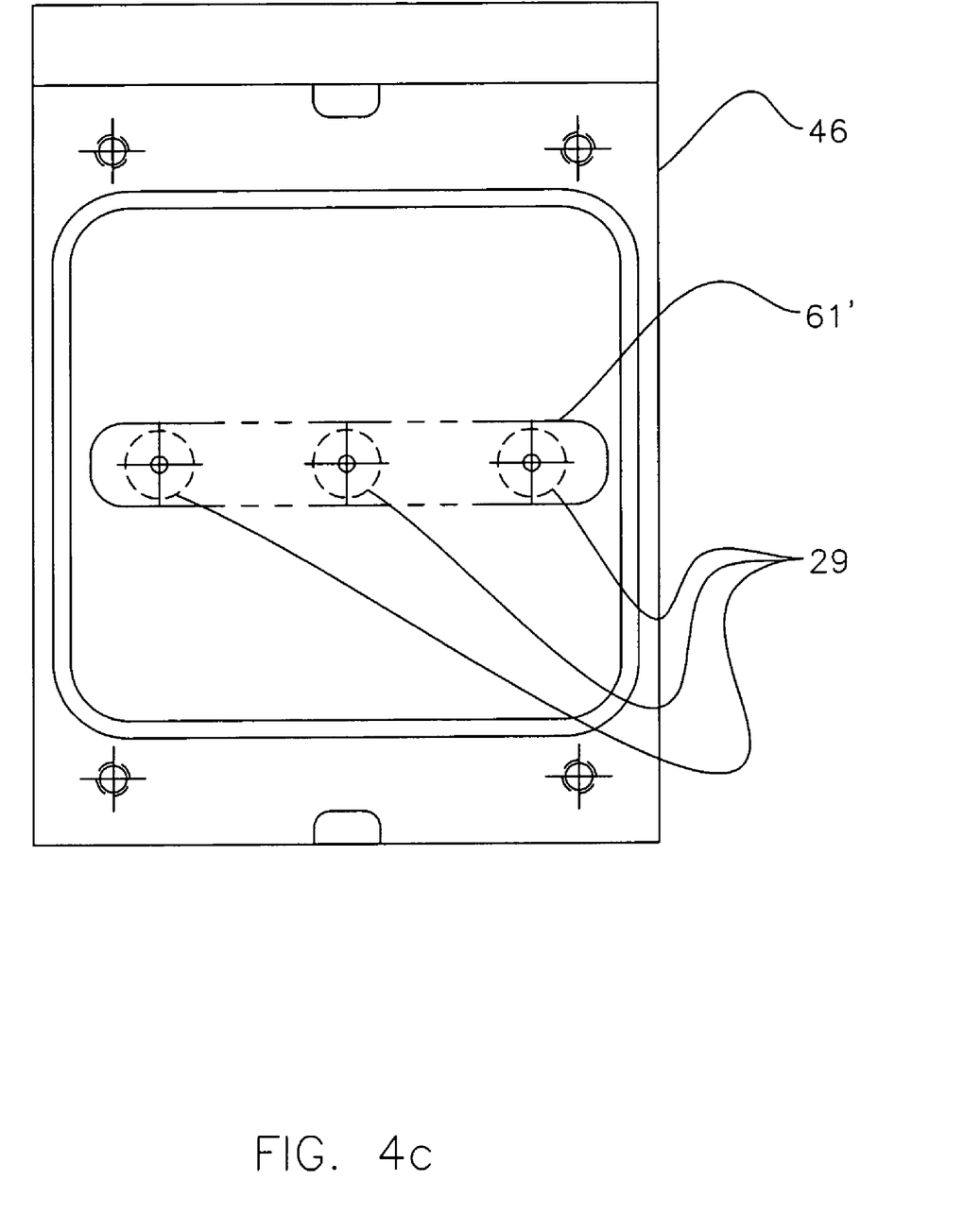
FIG. 4c is a view, from the perspective of the chocolate supply side, of a wear block showing plural ports corresponding to multiple lanes on a mold.

The size of the countersunk port opening is smaller than the opening of the mold cavity 24, so that liquid chocolate does not flow out over the edges of the cavity, and preferably small enough to prevent inclusions from flowing out of the mold cavity during operation. Although one countersunk port is shown in the cross section of FIG. 4a, the surface of the mold typically accommodates multiple lanes of mold cavities, and a similarly spaced row of ports 29 is provided in the wear block, as shown in FIG. 4c.

When the mold cavity 24 is completely filled with chocolate, or filled to the desired volume with chocolate, excess chocolate is returned via the return conduit 28 because the pressure at which the liquid chocolate is provided from the liquid chocolate supply is not great enough to force chocolate through the interface of the manifold block and the mold. Preferably, the flow of liquid through the liquid chocolate supply conduit is substantially constant, and is at least about 100 percent by volume of the flow required to fill the mold cavities to the volume desired. Preferably, an excess is provided, and the flow is from about 100 to about 220 percent of the amount required to fill the cavities. More preferably, the flow of liquid chocolate through the supply conduit to the mold cavity is from about 105 to about 150 percent by volume of the flow required to fill the mold cavities to the volume desired, and most preferably from about 110 to about 130 percent.

Generally, as shown in FIGS. 3a and 3b, the rotary molding apparatus incorporating a manifold 22 comprises a chocolate supply and a pump (not shown). The pump provides a constant flow of liquid chocolate from the supply, through the supply conduit 27, and to the fill insert 30 (or cavity 94), and provides a flow of any excess liquid chocolate through the return conduit 28, and back to the supply. The pump may provide a pressure of about 28 psig to about 30 psig.

A chocolate heater (not shown) may be provided in thermal contact with the fill insert 30, the supply conduit 27, and/or the return conduit 28, thereby substantially preventing unwanted solidification of chocolate in the apparatus (i.e., solidification outside of the mold cavities). Thermal jacketing 53 circulating thermal fluid in the vicinity of the conduits may be used for this purpose. A heater in thermal contact with the fill insert 30 will prevent unwanted solidification within the manifold body. When the liquid edible starting material is SOI chocolate, the heater may be configured to maintain the liquid chocolate in the apparatus at a temperature in a range of about 28° C. to about 32° C., so as to maintain the temper of the chocolate and prevent solidification. With non-SOI chocolate starting materials, the operable temperatures may vary, depending on how the material sets in the mold, and other factors.

The manifold may be placed at different points on the rotational course of the rotary mold other than twelve o'clock. This is helpful to accommodate placement of an inclusion feeder. As shown in FIGS. 3a and 3b, however, the retaining casting belt must be configured to retain the liquid chocolate in the cavities from a point immediately after it has been deposited until the chocolate has set and is ready to be demolded. The retaining/casting belt is positioned with respect to the mold to maintain the liquid chocolate in the mold cavities so that the cavities remain sealed after filling until the molded piece has set sufficiently to be removed. The rotary mold itself generally has a diameter of at least about 6 inches with no upper limit on the size except for engineering practicality. In a preferred embodiment, the mold has a 16-inch diameter. Cooperating with the mold, the retaining/casting belt is positioned over a retaining/casting belt roller, positioned proximate the mold cavity when it is filled to provide sufficient contact between the retaining/casting belt and the rotary mold surface to prevent any substantial leakage of liquid chocolate from the mold cavities. To ensure that the liquid chocolate is retained in the cavity, the retaining/casting belt roller preferably has a diameter of from about 0.5 inch (12.7 mm) to about 1.3 inches (33.02 mm).

As shown in FIG. 4a, a wear block extension 57 may be provided, positioned so that the mold cavities are covered from the point after the cavities are filled until the chocolate is retained by the retaining/casting belt, to prevent exposure of chocolate in the filled mold cavities and to transfer control over the chocolate in the cavity to the retaining/casting belt. The wear block extension 57 accommodates the radius of curvature of the retaining casting/belt roller (the retaining/casting belt and roller are not shown in the figure).

The use of a manifold 22 in the manner described, with a wear block 46, and fill insert 30 offers several advantages: aside from permitting continuous operation of the rotary mold, the countersink design of ports 29 facilitates stop-start operation and prevents flow back of inclusions, while the use of a low thermal conductivity wear block 46 with a high thermal conductivity fill insert 30 permits greater thermal control and efficiency. If the rotary mold is stopped, chocolate will solidify in the port 29. The tapered sidewall of the port permits the solidified chocolate plug to be dislodged with application of minimal back pressure. However, the invention as broadly understood and described herein is not limited to this specific design of the manifold. For example, as noted above, the manifold body may be provided with a cavity 94 and a member 92 protruding into the cavity as a flow control device, to force the flow of liquid chocolate into the mold cavities.

In another aspect of the invention, a continuous molding apparatus may be provided with an inclusion feeder, positioned to deposit at least one inclusion into the mold cavity prior to the liquid chocolate setting, before or after liquid chocolate is deposited into the cavity. As shown in FIG. 3a and FIG. 3b, inclusion feeder may comprise a rotating inclusion feeder drum 36 on support 63, with a plurality of inclusion cavities 38 on a radial surface thereof, and the rotary mold has a plurality of mold cavities 24. A bulk supply hopper 40 is positioned to introduce inclusions into each inclusion cavity 38 as the inclusion feeder drum rotates, and the brush 59 removes excess inclusions from the surface of the drum which are directed back to the supply hopper. The motion of the inclusion feeder drum 36 is synchronized with the rotation of the mold, preferably rotating in the opposite direction, such that inclusions in the inclusion cavities are deposited into the mold cavities.

The rotating drum is advantageously positioned above the mold, such that the inclusions 39 fall from the inclusion cavity 38 into the mold cavity 24 by gravity prior to depositing liquid chocolate. In the prior art rotary molding apparatus, the liquid chocolate feed could be positioned directly above the mold. To accommodate an inclusion feeder drum the retaining/casting belt and the manifold are advantageously repositioned to the side on the upper part of the rotating drum as shown in FIGS. 3a and 3b.

As inclusions 39, any edible that may be combined in a chocolate or chocolate-like composition may be used, including nuts, dried fruit, hard candy, soft panned confectionery (including gummies, jellybeans and the like), hard panned confectionery such as sugar-shell confectionery products (including hard sugar-shell coated chocolates), and the like. Preferably, the inclusions are fed to the inclusion feeder drum from a hopper and they are discrete and they do not adhere with each other, so that one or more inclusions can be easily deposited in and carried by the inclusion feeder drum. In a preferred embodiment, there are multiple inclusion cavities 38 on the inclusion feeder drum 36 and multiple mold cavities 24 on the mold 26, and the mold 26 and the inclusion feeder drum 36 rotate in opposite directions, the cavities lining up with each other so that the inclusions are deposited into the mold prior to the liquid chocolate being deposited.

In operation, liquid chocolate may be pumped continuously to the manifold 22 to fill the mold cavities and the rotary mold may rotate continuously. Tempered chocolate may be used, in which case temper may be maintained using temperature control, or non-SOI chocolate may be used. Both the supply and the rotation could be intermittent instead of continuous. At the same time, excess liquid chocolate is directed away through the liquid chocolate return conduit 28.

As the rotary mold rotates, the mold cavity is covered by the retaining/casting belt, which tracks and runs in unison with the rotating mold. While the rotary mold preferably rotates continuously in unison with the retaining/casting belt, the mold and belt may also rotate in unison in an intermittent manner, such that liquid chocolate is fed into the mold recess, and then the rotary mold is rotated, and so on. The retaining/casting belt retains the liquid chocolate within the recess of the mold while it sets and casts to the belt. The retaining/casting belt may be cooled by providing a continuously circulating coolant to the cooler 12 below the retaining/casting belt at a portion of the belt positioned downstream of the rotary mold.

The retaining/casting belt is not shown in FIG. 3a, 3b, or 4a, however a configuration in which the retaining/casting belt is pressed against a rotary mold is shown in the aforementioned U.S. Pat. Nos. 6,217,927 B1 and 6,302,677 B1. With the addition of the manifold as described herein, it may be desirable to keep the retaining/casting belt in a pressing relationship against the mold after the 6 o'clock position. This would allow the chocolate more time to solidify in the mold, and the pieces can be demolded at the 7 o'clock, 8 o'clock or 9 o'clock position, for example.

As the inclusion feeder drum 36 rotates beneath the hopper 40, an inclusion recess 38 is positioned beneath the hopper, such that an inclusion is deposited into an inclusion cavity using brush 59 to remove excess inclusions from the surface of the drum and return them to the supply hopper. The inclusion cavity may be sized to accept one or more inclusions 39. Most preferred is to have the inclusion cavity sized to accept a single inclusion. In this case, multiple inclusion cavities may be needed per mold cavity to deliver multiple inclusions to a single mold cavity. The rotating drum, which has a rotation indexed to the rotation of the rotary mold, rotates in such a manner that an inclusion 39 is introduced into a mold cavity 24 before chocolate is introduced by the chocolate feeder. The mold cavity is then rotated to the manifold, where melted chocolate is introduced into the cavity and surrounds the inclusion. The positions and order of introduction may be reversed to allow introduction of the chocolate into the mold cavity before the introduction of the inclusion. This will limit placement of the inclusion feeder to roughly the 12 o'clock position. In this case, the retaining/casting belt will be positioned immediately after the inclusion feeder. The inclusion feeder transition chute 70 may have an extension similar to wear block extension 57 to permit close placement of the retaining/casting belt roller.

The following Example according to the invention illustrates one embodiment of continuous molding utilizing the manifold described herein, and deflashing utilizing the methods and apparatus described herein, and should not be considered as limiting the invention.

EXAMPLE

Dove Milk Chocolate, a commercially available milk chocolate, was melted and tempered in a Sollich Mini Tempering System TFD 150 (Sollich KG, Bad Salzuflen (DE)). The chocolate was cooled from 45° C. to 28° C. to produce cocoa butter crystals of stable and unstable polymorphs. The tempered chocolate was then warmed slightly to 31° C. to melt out unstable crystals. The tempered chocolate was at 31° C. and had a temper level of 6 CTU (° F.) and 0.5 slope as determined by Tricor Tempermeter Model 501 (TRICOR Systems Inc., Elgin, Ill. (US)). The chocolate was pumped to a manifold located at the 10 o'clock position on the rotary forming device. The manifold consisted of a polymer wear block that conformed to the radius of the forming wheel. Product cavities were cut around the circumference of the forming wheel, each product cavity having dimensions of 25 mm×25 mm×10 mm deep with a wall taper of 7 degrees. The flow rate of chocolate to the manifold was 1.8 kg/min, the flow was approximately 120 percent of that required to fill the cavities. The channel configuration in the manifold was such that the excess flow was directed back to a re-melt tank and introduced back into the tempering system. The forming wheel was a 16 inch diameter metallic wheel rotating at 2 RPM and cooled with coolant having a temperature of −10° C. The wear block provided a dynamic seal and contained channels that allowed chocolate to flow into the mold cavity on the forming wheel. The forming wheel was housed in an environment that was maintained at a dew point of −15° C. Some overfilling of the mold cavities did occur, creating a web of flash around the cavity. The cavity was contained on top by the manifold until it rotated under the Kevlar® fiberglass composite retaining/casting belt running concurrently to a portion of the circumference of the wheel. A roller was provided to maintain a seal between the manifold and the belt. The belt contained the chocolate in the cavity as the wheel rotated until it reached the 6 o'clock position. As the filled cavity was rotated the chocolate began to solidify and reached a surface temperature of 5° C. on the chocolate surface in contact with the mold cavity. At that point the belt separated from the wheel, thereby removing the molded pieces from the mold cavities and carrying away the molded pieces and surrounding flash. The belt moved at a linear speed of 8.5 ft/min. over a cooler which cooled the top surface of the belt to a temperature of about to 8° C. The belt and cooler were housed in an environment with a dew point of −15° C. The cooler further solidified the bottom of the chocolate piece and the surrounding flash. The chocolate piece and flash traveled for approximately 70 seconds in contact with the cooler. Next, the belt traveled over a separate heater maintained at 35° C. The heat from the plate transferred through the belt into the chocolate flash and chocolate piece for a period of 2 seconds in which the belt is in contact with the heater. The flash, being thinner, softens and sticks to the belt as the belt reverses direction over the bull nose. The flash which remained adhered to belt was removed using a scraper on the underside of the conveyor. The chocolate piece is transferred to a pick-up belt and enters a conditioning tunnel with one section with an air temperature of 15° C. The residence time in the tunnel was 10 minutes. The resultant finished chocolate piece exiting the tunnel had a fairly glossy surface and was bloom stable.

The foregoing description of the preferred embodiments is not to be deemed limiting of the invention, which is defined in the appended claims.

What is claimed is:

1. An apparatus for continuously molding chocolate, comprising: a mold having an outer surface with at least one mold cavity; the mold configured for relative motion with respect to a manifold; the manifold comprising a liquid chocolate supply conduit and a liquid chocolate return conduit and a manifold body comprising a port, wherein the manifold body comprises a wear block contacting and sealed against the outer surface of the mold and in frictional contact with the mold as the mold moves with respect to the manifold; wherein the liquid chocolate supply conduit is in fluid communication with the liquid chocolate return conduit and the at least one mold cavity.

2. The apparatus according to claim 1, further comprising a pump adapted to supply liquid chocolate through the supply conduit in an amount in a range of about 100 to about 220 percent by volume of the flow required to fill the at least one mold cavity to a desired volume.

3. The apparatus according to claim 1, further comprising a liquid chocolate supply and a pump, wherein the pump provides a constant flow of liquid chocolate from the supply, through the supply conduit, and to the mold cavity, and provides a flow of excess liquid chocolate through the return conduit back to the supply.

4. The apparatus according to claim 1, further comprising at least one heater in thermal contact with the manifold, thereby substantially preventing unwanted solidification of chocolate in the apparatus.

5. The apparatus according to claim 1, wherein the manifold body further comprises: a backing plate.

6. The apparatus according to claim 1, wherein the port has a tapered side wall.

7. The apparatus according to claim 1, wherein the mold is a rotary mold, and further comprising a retaining/casting belt in cooperation with a retaining/casting belt roller having a diameter of from about 0.5 inch (12.7 mm) to about 1.3 inches (33.02 mm) positioned to maintain the liquid chocolate in the mold cavities to prevent substantial leakage of liquid chocolate from the mold cavities.

8. The apparatus according to claim 1, further comprising an inclusion feeder drum having inclusion cavities, the drum adapted to move in cooperation with the mold so that inclusions are deposited from the inclusion cavities into the mold cavities before the liquid chocolate solidifies.

9. The apparatus according to claim 1, wherein the mold is a substantially cylindrical rotary mold having a plurality of mold cavities arranged on an outer surface thereof, and an interior cavity in communication with a coolant source effective to cool the mold cavities to at least partially solidify liquid chocolate deposited in the mold cavities.

10. The apparatus according to claim 5, wherein the manifold body further comprises a flow control device.

11. The apparatus according to claim 10, wherein the flow control device is a polymeric or metal insert positioned between the wear block and the backing plate.

12. The apparatus according to claim 10, wherein the flow control device is a member attached to the backing plate and protruding into the manifold body.

13. The apparatus according to claim 1, wherein the wear block comprises a plurality of ports, each port directing chocolate to a corresponding lane of mold cavities in a rotary mold.

14. The apparatus according to claim 11, wherein the insert is provided with a channel directing liquid chocolate from a supply to a plurality of ports in the wear block.

* * * * *